G. H. WOLFF.
CASH REGISTER.
APPLICATION FILED MAY 7, 1909.

960,759. Patented June 7, 1910.
6 SHEETS—SHEET 1.

Inventor
G. H. Wolff.

Witnesses
Samuel Payne
Xx. Butler

By H. C. Evert
Attorneys

G. H. WOLFF.
CASH REGISTER.
APPLICATION FILED MAY 7, 1909.
960,759.
Patented June 7, 1910.
6 SHEETS—SHEET 2.
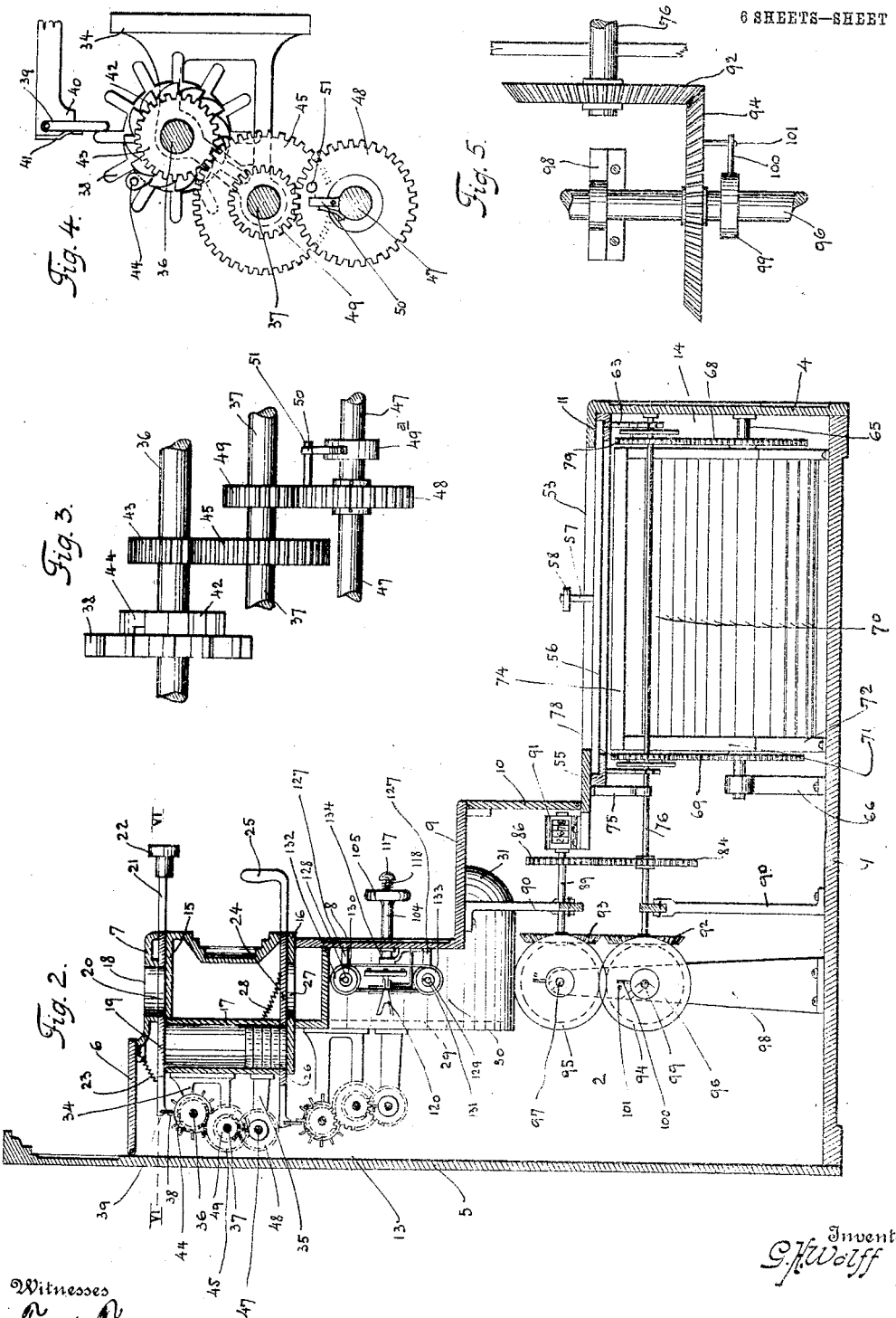

G. H. WOLFF.
CASH REGISTER.
APPLICATION FILED MAY 7, 1909.

960,759.

Patented June 7, 1910.
6 SHEETS—SHEET 4.

Witnesses
Frank Trimmer
L. H. Butler

Inventor
G. H. Wolff
By H. C. Evarts &c.
Attorneys

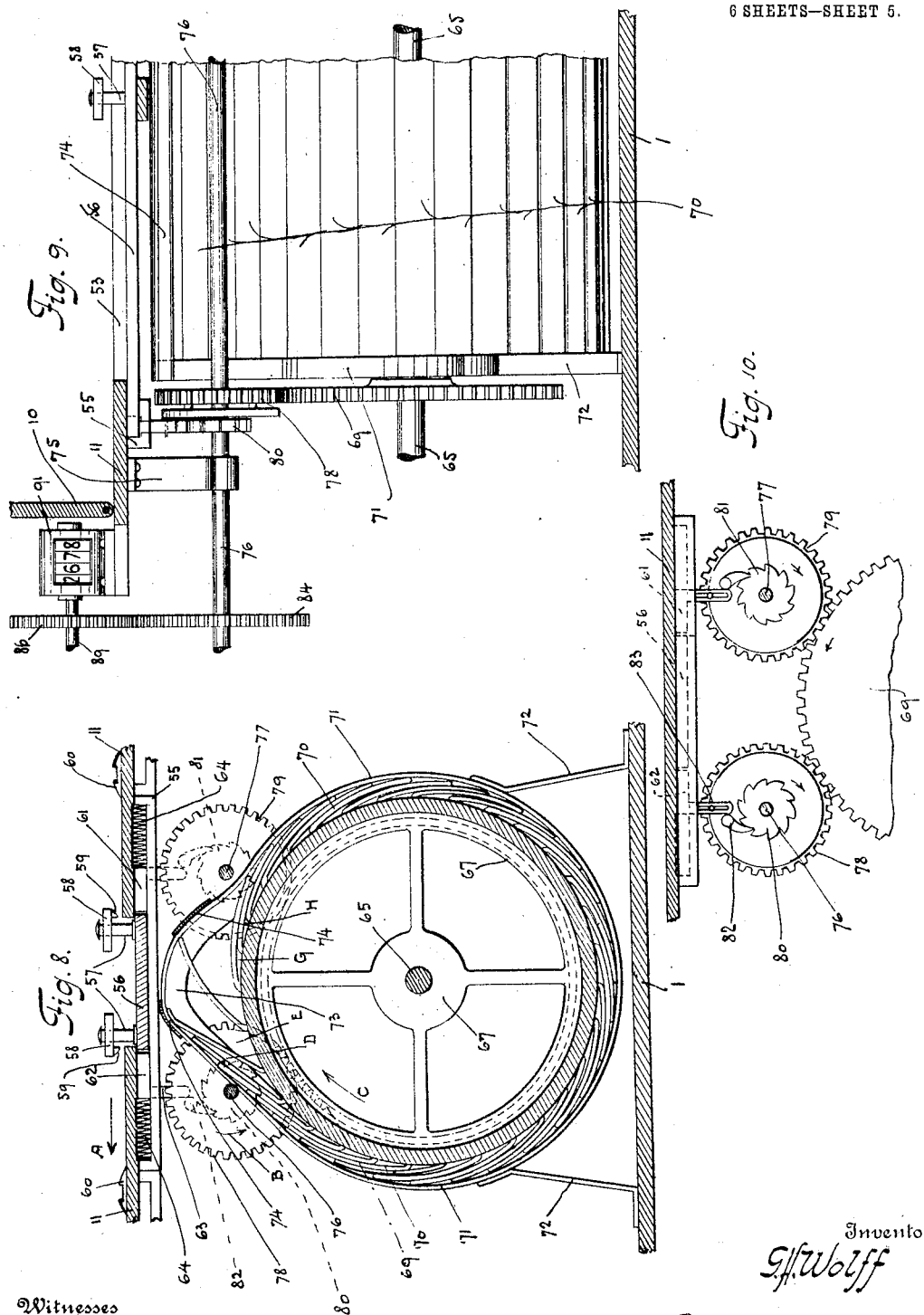

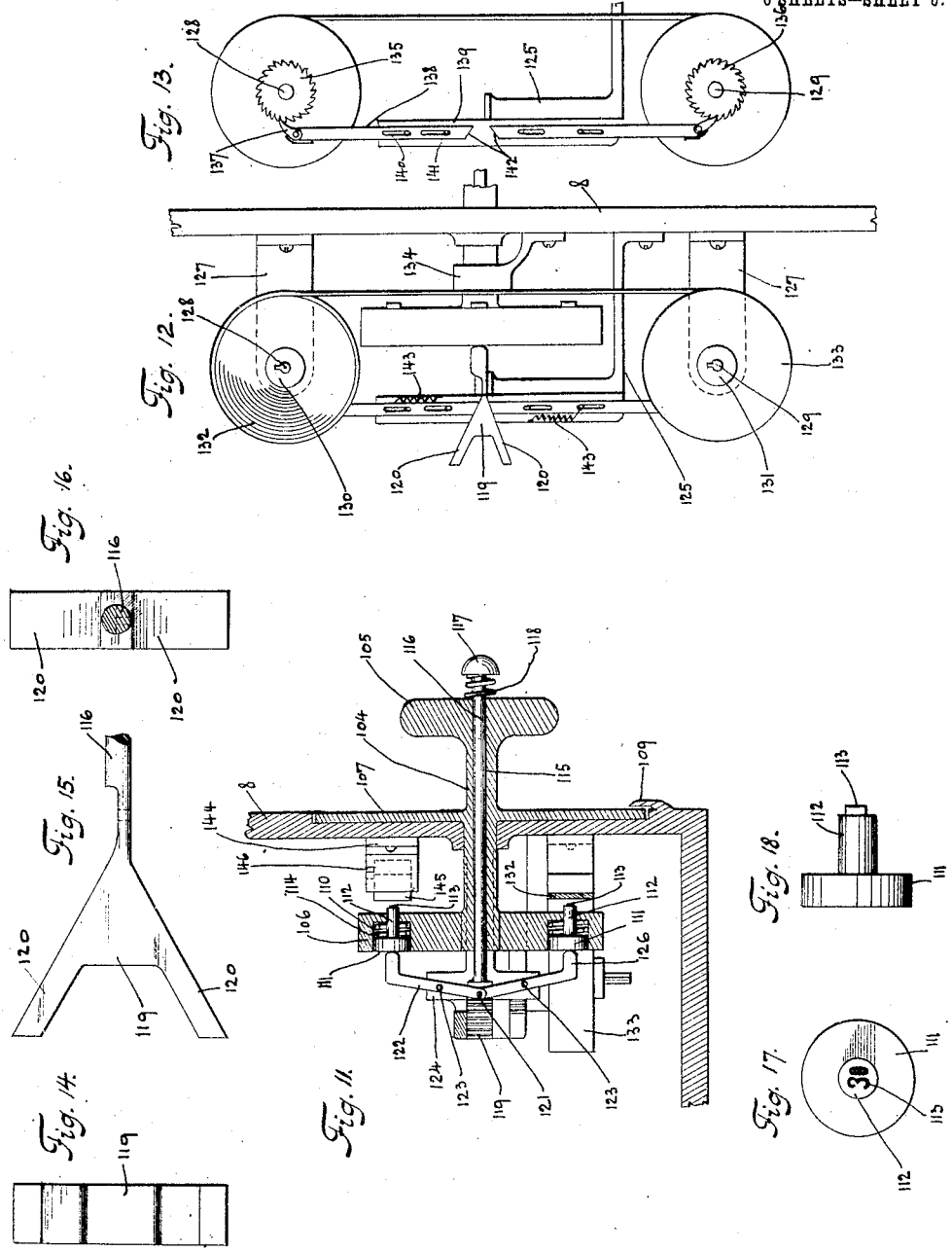

UNITED STATES PATENT OFFICE.

GEORGE H. WOLFF, OF PITTSBURG, PENNSYLVANIA.

CASH-REGISTER.

960,759.  Specification of Letters Patent.  Patented June 7, 1910.

Application filed May 7, 1909. Serial No. 494,652.

*To all whom it may concern:*

Be it known that I, GEORGE H. WOLFF, a citizen of the United States of America, residing at Pittsburg, in the county of Allegheny and State of Pennsylvania, have invented certain new and useful Improvements in Cash-Registers, of which the following is a specification, reference being had therein to the accompanying drawing.

This invention relates to cash registers, and the invention has for its primary object to provide a register with positive and reliable means for maintaining an accurate account of all monies placed in the register and removed therefrom.

Another object of the invention is the provision of simple and effective means in connection with the cash register for facilitating the operation of obtaining change from the register.

The invention in its broadest aspect involves novel means for maintaining an accurate account of monies placed in the register and removed therefrom, together with an accurate account of the sales, whereby the proprietor of a store can readily ascertain if money has been honestly deposited and removed from the cash register. To this end, I have devised a cash registering machine embodying a plurality of structural elements which when combined provide a durable, efficient and easily manipulated machine adapted to maintain a record along the lines of a bookkeeping system, whereby the receipts for a period of time can be quickly computed and any discrepancy in connection with a sale quickly detected.

The principal elements of the invention, to wit,—a casing, a coin-receiving and delivering mechanism, a registering mechanism therefor, a paper money-receiving and delivering mechanism, a registering mechanism therefor, and a sales recorder will be hereinafter separately and specifically described in detail, together with the novel arrangement and objects accomplished by the foregoing combination of elements.

The preferred embodiments of the invention are illustrated in the accompanying drawings, but I desire it to be understood that the same are susceptible to various changes without departing from the scope of the invention.

Figure 1:
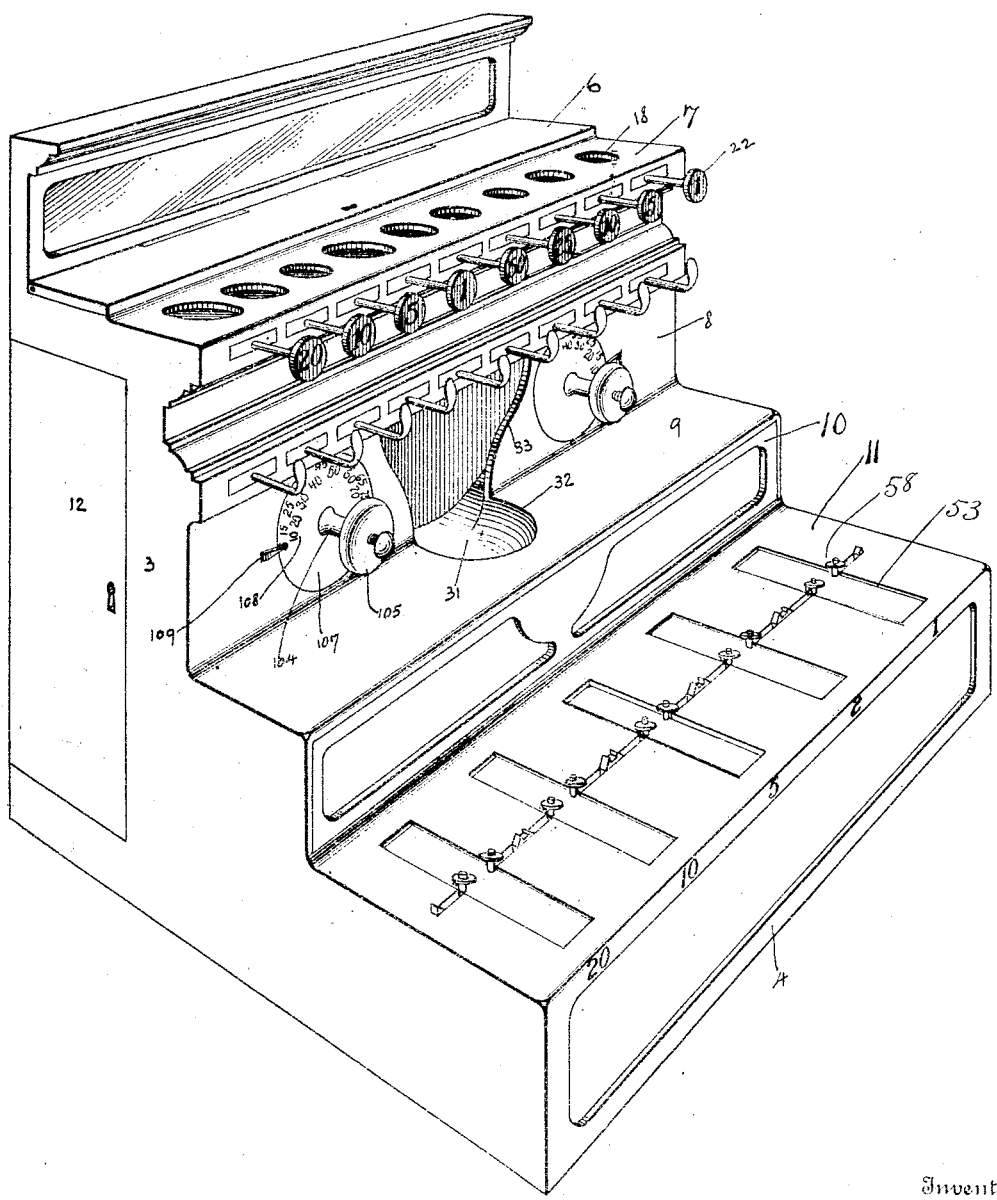
Figure 6:
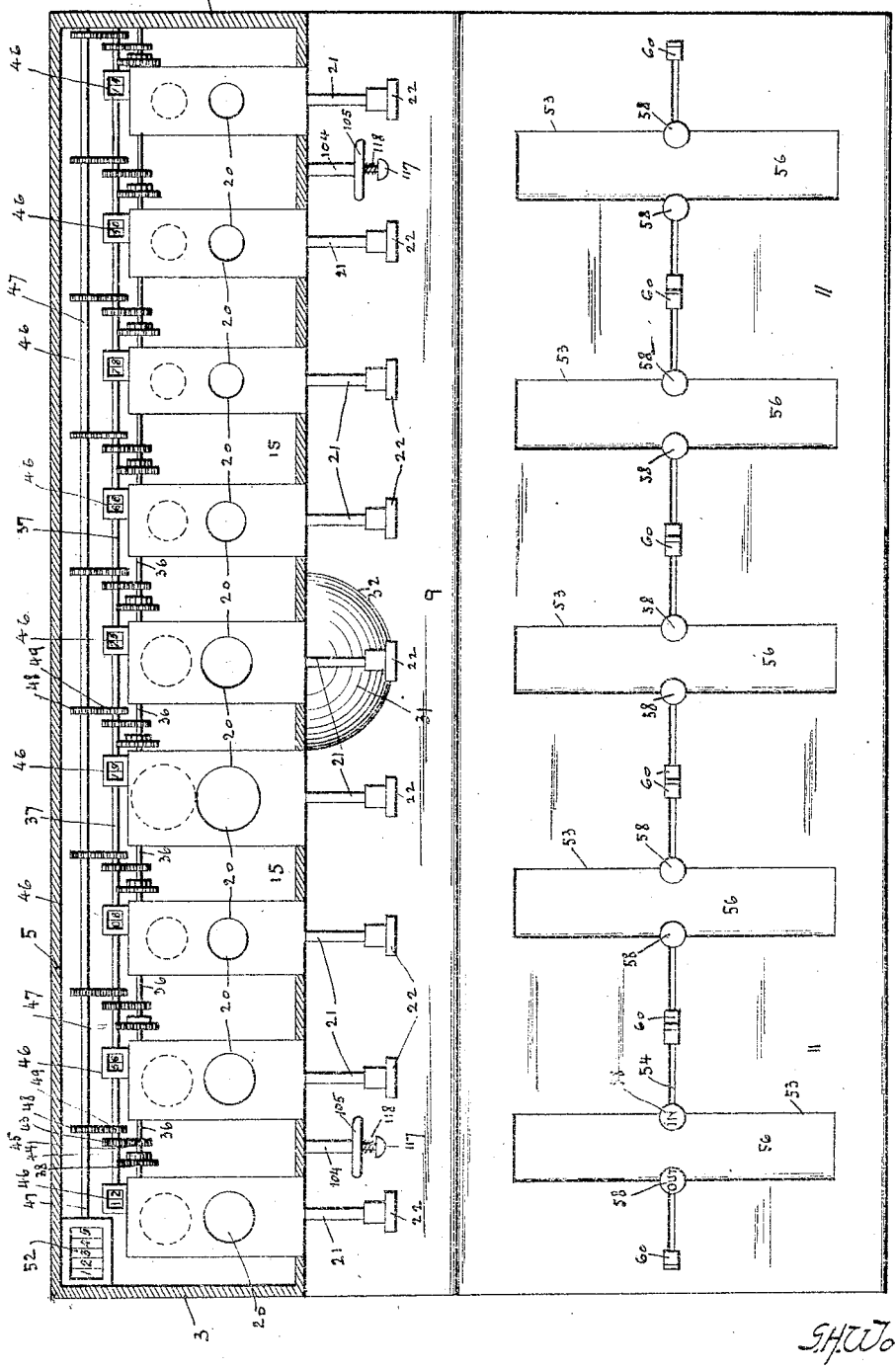
Figure 7:
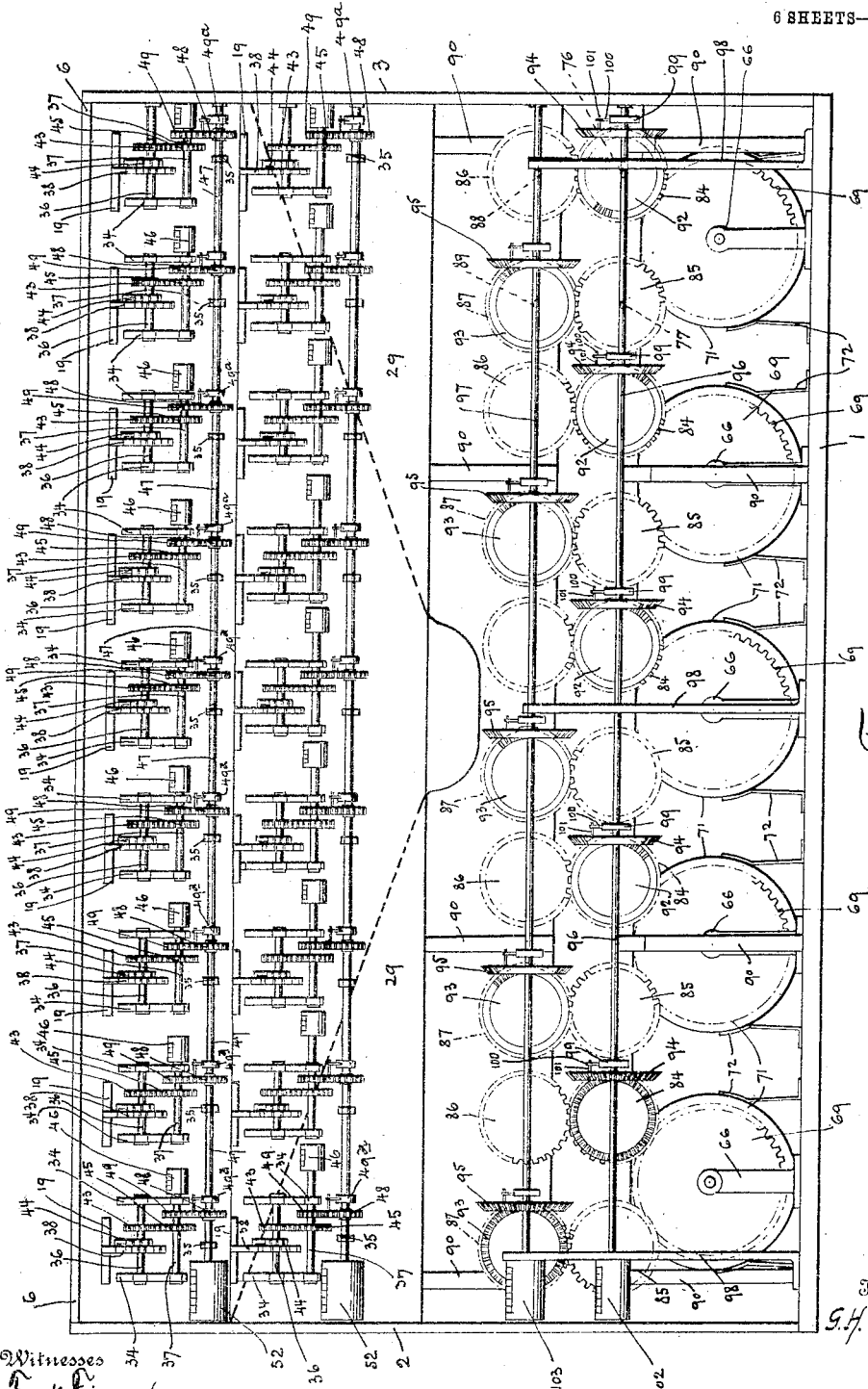

Reference now being had to the drawings, Figure 1 is a perspective view of a cash register constructed in accordance with my invention, Fig. 2 is a vertical cross sectional view of the cash register, Fig. 3 is a front elevation of a portion of the registering mechanism used in connection with the coin receiving and delivering mechanism, Fig. 4 is a side elevation of the same, Fig. 5 is a plan of a portion of the registering mechanism used in connection with the paper receiving and delivering mechanism, Fig. 6 is a horizontal sectional view taken on the line VI—VI of Fig. 2, showing a portion of the machine in plan, Fig. 7 is a rear elevation of the machine with the contact plate thereof removed, illustrating diagrammatically the arrangement or grouping of the registering mechanism of the machine, Fig. 8 is an enlarged longitudinal sectional view of a portion of the machine, illustrating the paper receiving and delivering mechanism, Fig. 9 is a side elevation of a portion of the same, Fig. 10 is an elevation of a portion of the paper receiving and delivering mechanism, Fig. 11 is a vertical cross sectional view of a portion of the sales registering mechanism, Fig. 12 is an elevation of the same illustrating the record ribbon or type of the sales register, Fig. 13 is a similar view illustrating the mechanism for intermittently actuating the record type or ribbon of the sales register, Fig. 14 is a rear elevation of an actuating head, Fig. 15 is a side elevation of the same, Fig. 16 is a front elevation of the same, Fig. 17 is a front elevation of a type block forming part of the sales register, and Fig. 18 is a side elevation of the same.

My cash register in its entirety is constructed of strong and durable metal, consisting of castings, drop forgings and stamped sheet metal parts, which are assembled to provide a rigid structure capable of withstanding constant use without being injured.

In connection with the machine, I employ registering mechanisms of a conventional form, particularly those in connection with the coin and paper receiving and delivering mechanisms, these registering mechanisms being compactly located and arranged whereby easy access can be had thereto to ascertain the amount of work performed by each. The stability of the machine permits of one or more clerks or operators manipulating the same without the registering mechanism in one part of the machine interfering with the registering mechanism in another part.

In devising the machine, I have aimed to entirely eliminate the nefarious practice of clerks, particularly bar-tenders, obtaining money that rightfully belongs to the proprietor of the establishment. Devious ways have been devised by bar-tenders for appropriating or "knocking-down-on" sales, and to eliminate such a practice I have provided a machine for maintaining an accurate account of all monies received and removed from a cash register, when a sale has been made, and the amount of the sale registered, thus permitting the proprietor of an establishment of checking each and every sale and ascertaining in connection with what sale change has been improperly made. For instance, if a sale of 70¢ is made, and $1. deposited in the cash register and 30¢ removed, the fact that $1. has been placed in the machine is registered, and the fact that 30¢ has been removed is registered, and for the convenience of the proprietor of an establishment, the machine is provided with total records that permit of a proprietor ascertaining the total amount placed in the machine and the total amount removed, it being an easy matter in view of such totals to quickly ascertain the amount within the machine that represents the sales that have taken place in a certain period of time.

Considering the various features of the invention in detail, reference will first be had to the cash register casing and compartment.

The casing of the cash register has a contour somewhat upon the lines of the present well known type of cash register, and the casing comprises a base plate 1, end walls 2 and 3, a front wall 4, and a detachable rear wall 5. The upper edges of the end walls 2 and 3 are stepped, to support a stepped cover plate, said cover plate consisting of a longitudinal hinged door 6 connecting with the rear wall 5, a coin depositing horizontal ledge 7, a vertical wall 8, a horizontal change ledge 9, a vertical hinged door 10, and a horizontal paper depositing ledge 11, the ledges 7, 9 and 11 being parallel with the base plate 1, while the wall 8, door 10 and front wall 4 are parallel with the rear wall 5, thus providing a stepped cover for the casing that permits of one part of the register being used or manipulated by another operator. The doors 6 and 10 permit of easy access being had to the interior of the register, and besides these doors, the end walls 2 and 3 are equipped with doors 12.

That portion of the machine below the door 6 of the ledge 7 and between the upper part of the rear wall 5 and the vertical wall 8, constitutes a compartment, which I have designated 13, for the coin receiving and delivering mechanism, together with the registering mechanism thereof, and in the ends of this compartment are located sales registers which are supported by the vertical wall 8 and actuated from the exterior side of said wall.

That space within the machine between the ledge 11 and the base plate 1, constitutes a compartment 14 for the paper receiving and delivering mechanism, while the space in the rear of this compartment is utilized for the registering mechanism of the paper receiving and delivering mechanism. I would have it understood, however, that the disposition of the registering mechanism entirely depends upon the size and design of the register, and that the arrangement of the registering mechanism herein shown is preferable since the records can be easily reached or observed, by opening the doors 6, 10 and 12.

*Cash Receiving and Delivering Mechanism.*—In the compartment 13, are arranged two horizontal longitudinal partitions 15 and 16 supported by the vertical wall 8. The partition 15 is of a less width than the partition 16, and these partitions are adapted to support vertical coin holders 17, cylindrical in form and of various diameters, whereby silver and gold coins from one cent to a twenty-dollar gold-piece can be held in said holders. The size and shape of the holders, however, depends upon the currency of the country in which the cash register is used.

The horizontal ledge 7 is provided with a plurality of openings 18, one opening for each holder, with said opening corresponding in diameter to the interior diameter of the holder represented by said opening. Slidably mounted upon the partition 15 beneath the ledge 7 are a plurality of depositing slides 19, said slides being located beneath the openings 18 and provided with openings 20 corresponding in diameter to the openings 18 and to the interior diameters of the holders 17. The depositing slides 19 are provided with push rods 21 and buttons 22 extending from the vertical wall 8 of the machine, each button being designated to represent the coin to be deposited by that particular slide. The depositing slides 19 are normally maintained in position to receive coin by retractile springs 23 connected to the rear ends of said slides and to the rear inner edge of the ledge 7.

It is obvious that when a coin is deposited in one of the openings 18, that it rests upon the partition 15 within the opening 20 of the slide and that when said slide is pushed inwardly, the coin within the slide will be carried to the holder 17 and deposited in the holder immediately upon the opening 20 of the slide registering with the holder.

Upon the partition 16 beneath the holder 17 are arranged a plurality of delivery slides 24, and the forward ends of these slides are provided with hooks or pull-rods 25. The rear ends of the delivery slides 24 are provided with openings 26 adapted to register with the coin holder 17, and these openings 26 are adapted to receive coins which rest upon the partition 16 when the delivery slides are in their normal position. When the delivery slides are pulled outwardly, the coins within the openings 26 will be carried forward upon the partition 16, and deposited through openings 27 provided therefor in the partition 16. The rear end of the slides 24 retain coins in the holders during the forward movement of the delivery slides, and to return these slides to their normal position, retractile springs 28 are connected to said slides and to the holder 17.

It will thus be observed that one depositing slide, one coin holder, and one delivering slide constitutes a unit of the cash register for receiving, temporarily holding and delivering coins, each unit caring for a coin of a certain denomination.

To receive coins delivered through the openings 27 and convey the coins to a central point, whereby the various coins making "change" can be easily obtained, I provide the vertical wall 8 beneath the partition 16 with a novel chute adapted to deflect coins into a pocket or tray located centrally of the ledge 9. The coin chute comprises the rear walls 29 and inclined end walls 30, said inclined walls 30 converging from the end walls 2 and 3 to a central pocket or tray 31 suspended beneath the ledge 9, easy access being had to the pocket or tray through an opening 32 formed in the ledge 9 and an opening 33 formed in the vertical wall 8, the last mentioned opening providing clearance for the hand when scooping up the coins in the pocket 31.

By an operator pulling upon certain of the rods 25, accurate change can be accumulated in the pocket 31 and easily removed therefrom, thus facilitating the operation of delivering change and making it unnecessary to count the change when the proper rods 25 have been pulled.

*Registering mechanism for the depositing and delivering of coins.*—As heretofore stated, this registering mechanism is of a conventional form, and in showing and describing the mechanism which I have employed, to fulfil the requirements of the machine, it is to be understood that various kinds of registering mechanism can be used for the purposes, and since the registering mechanism is duplicated in a great many instances, I deem it only necessary to describe the construction and operation of a single register and the coöperation of the single register with the total recorder.

Two single registering mechanisms are used in connection with each of the coin receiving and delivering units, one single register for the receiving of coins, and one for the delivering of coins, the former being actuated by a forward movement of a depositing slide and the latter by an outward movement of a delivery slide, said registers being independent of one another, but each coöperating with a total register, whereby an accurate register can be maintained of the number of coins deposited in the machine and delivered by the machine. For instance, a single register maintains a record of the number of silver dollars placed in the machine, and another recorder the number of silver dollars removed from the machine, while total recorders maintain a record of all monies, irrespective of other denominations deposited in the machine and removed therefrom.

Each coin holder 17 is provided with rearwardly extending brackets 34 and 35 and journaled in the brackets 34 are shafts 36 and 37. Loosely mounted upon the shaft 36, is a star wheel 38 and adapted to engage said star wheel is a depending pivoted arm 39, carried by the rear end of the depositing slide 19. This depending arm 39 is normally held in engagement with a depending lug 40 by a spring 41, said lug and spring being carried by the rear end of the depositing slide, whereby when the depositing slide is pushed inwardly, the arm 39 bearing against the lug 40 will move the star wheel 38. The arm 39 can recede over the star wheel should occasion demand when the depositing slide 19 assumes its normal position.

Fixed upon the shaft 36 is a ratchet wheel 42 and a gear wheel 43, the former being engaged by a pivoted pawl 44, carried by the star wheel 38, while the latter meshes with a large gear wheel 45 mounted upon the shaft 37. The shaft 37 extends into a register 46 supported by the coin holder 17. This recorder is of the ordinary and well known type and is adapted to register each and every time the star wheel 38 is moved by the depositing slide.

The single register used in connection with the delivery slide 24, is identical with that just described, with the exception that the register is actuated by a reversed movement, that is, by an outward movement of the delivery slide. This single register for the delivery slide is supported from the rear wall 29 of the coin chute, as best shown in Fig. 2 of the drawings.

The total register used in connection with each single register, comprises a longitudinal shaft 47 journaled in the brackets 35. Loosely mounted upon said shaft are gear wheels 48 meshing with the gear wheels 49 fixed upon the shaft 37. Mounted upon the shaft 47 adjacent to each one of the gear wheels 48 is a hub 49ª having a radially disposed pivoted spring pressed arm 50 adapted to be impinged by a pin 51 carried by the gear wheel 48. The shaft 47 extends into a total register 52, located at one end of the cash register, this total register also being of a conventional form. The size of the wheels 48 together with the number of teeth carried thereby determines the actuations of the shaft 47 to operate the recorder 52. For instance, if the shaft 37 assists in maintaining a record of five-cent pieces, the gear wheels 48 and 49 would be provided with twenty teeth, whereby a complete revolution of said wheels would represent twenty five-cent pieces having been deposited in the machine or delivered from the machine. When the gear wheel 48 makes a complete revolution, the pin 51 moves the shaft 47 and causes the shaft to register the fact that twenty five-cent pieces or a dollar has been deposited in the machine.

The pivoted spring pressed arm 50 operates similar to the arm 39 of the depositing slide, in so much that the arm 50 recedes to clear the pin 51 when the shaft 47 is moved by other single registers.

*Paper money receiving and delivering mechanism.*—In the compartment 14 of the cash register there are located mechanisms for receiving and delivering paper money, sufficient mechanisms being provided to care for one dollar, two dollar, five dollar, ten dollar and twenty dollar bills, and as these mechanisms are identical in construction, simply one mechanism will be hereinafter described.

The ledge 11 of the cash register is provided with five equally spaced oblong openings 53 and the material bordering upon the sides of said openings is provided with oppositely disposed longitudinal slots 54. The ledge 11 at each end of the openings 53 is provided with depending slotted guides 55, and slidably mounted in said guides is a horizontally movable shutter 56 adapted to close the openings 53. The longitudinal sides of the shutter 56 intermediate the ends thereof are provided with knobs 57 having loosely mounted heads 58 provided with depending latches 59. These knobs are adapted to enter the slots 54 when the shutter 56 is shifted to one side or the other, and the depending latches 59 are adapted to engage keepers 60 arranged at the ends of the slots 54, for maintaining the shutter in an open position.

Located within the guides 55 are transverse bars 61 and 62, each bar having one end thereof provided with a depending arm 63, said arm extending through a slot provided therefor in the guides 55. The bars 61 and 62 are normally retained in engagement with the longitudinal edges of the shutter 56 by coil springs 64 located in the guides 55, these springs normally maintaining the shutter 56 in a closed position.

The paper receiving and delivering mechanism beneath each one of the shutters 56 comprises a revoluble shaft 65 journaled in the front wall 4 and a bearing 66 provided therefor upon the base plate 1. Upon the shaft 65 is mounted a drum 67 and gear wheels 68 and 69. The periphery of the drum 67 is provided with circumferentially arranged overlapping resilient blades 70 and between these blades the paper money or bills are placed. The blades 70 are normally held in an overlapped position by two retaining members 71 arranged at the ends of a drum. These members are supported by brackets 72 carried by the base plate 1, and said members are preferably made of angle iron, whereby the flanges thereof will guide and retain the blades 70 in the position desired as the drum 67 is rotated. The members 71 at the top of the drum 67 and beneath the shutter 56 are provided with raised portions 73 connected by transverse guards 74, said raised portions allowing the outer edges of the blades 70 to rise, as best shown in Fig. 8, and provide space between the resilient blades for holding a paper bill, which is placed between said blades by opening the shutter 56, it being preferable to fold the bill once, whereby it will snugly fit between two blades and permit of said blades overlapping as they are carried out of engagement with the raised portions 73 of the members 71.

To revolve the drum 67 in either direction, the ledge 11 is provided with depending hangers 75 and journaled in said hangers and the front wall 4 are shafts 76 and 77, said shafts extending rearwardly below the ledge 9. Mounted upon the shaft 76 is a gear wheel 78 meshing with the gear wheel 69 at one end of the drum 67, and upon the shaft 77 is a gear wheel 79 meshing with the gear wheel 68 at the opposite end of the drum. Mounted upon the shafts 76 and 77 adjacent to the gear wheels 78 and 79 are ratchet wheels 80 and 81, the wheel 81 having the teeth thereof reversed relative to the teeth of the ratchet wheel 80. Adapted to engage the ratchet wheels 80 and 81 are pivoted gravity pawls 82, loosely connected as at 83, to the depending arms 63 of the bars 61 and 62.

The operation of the paper receiving and delivering mechanism is as follows:—Assuming that the shutter 56 is moved to the left in the direction of the arrow A (Fig. 8), the shutter 56 moves the bar 62 and causes the pawl 82 carried by the depending arm 63 to move the ratchet wheel 80. As this ratchet wheel is moved, the gear wheel 78 turns in the direction of the arrow B and moves the drum 67 in the direction of the arrow C. This movement of the drum 67 permits of bills that have been previously placed upon the periphery of the drum to be obtained. It will thus be observed that the bills are not actually delivered, as coins, but are simply placed in position whereby they can be easily obtained by inserting the fingers in the opening 55. When the drum 67 rotates in the direction of the arrow C, the gear wheel 79 and the ratchet wheel 81 are moved, and the pawl 82 supported from the bar 61 rests in the arms 63 of said bar and eventually obtains a fresh grip upon the ratchet wheel 81, whereby the drum 67 can be rotated in the opposite direction. If the shutter 56 is moved to the right and moves the bar 61, the ratchet wheel 81 and the gear wheel 79 are moved to rotate the drum 67 in an opposite direction from that previously described, whereby the two resilient blades 70 that have been previously opened will be closed, and another pocket between the two blades presented at the opening 53, whereby a paper bill can be placed in the opening.

In order that the operation of depositing and obtaining bills from the drum 67 can be more fully understood, I have designated certain pockets between the blades D, E, F, G and H. As it is the practice to place certain sums of money in the machine, whereby change can be made, I will assume that the pockets D and E each contain a dollar bill, and that the movable heads 58 of the shutter 56 have been provided with suitable designations, such as "in" and "out", whereby the operator of the cash register will know in which direction to move the shutter to take money "out" of the machine, and place money "in" the machine. If the operator desires to place a dollar in the machine the "in" head is gripped and the shutter 56 moved to the right. In moving the shutter 56 to the right the pocket F is presented to the opening 53, while the pocket E is closed similar to the pocket D. After the dollar has been placed in the pocket F, the shutter 56 can be released and the spring 64 will move the bar 61 in the shutter 56 without affecting the movement of the drum 67, consequently the dollar is still retained in the pocket F presented to the opening 53. To obtain a dollar from the drum 67, the "out" head 58 of the shutter 56 is gripped and the shutter moved to the left, thus rotating the drum 67 in an opposite direction and partially closing the pocket F, while the pocket E is presented to the opening 53 to permit of the dollar being removed from the pocket. It will thus be observed that the drum 67 is moved in the direction of the arrow C for the removal of money from the drum, and in an opposite direction for placing money upon the drum, these two distinct movements recording when money is deposited in the machine or received from the machine, irrespective of whether one or more bills are placed in either of the pockets.

*Registering mechanism for the paper money receiving and delivering mechanism.*—Upon the shafts 76 and 77 are mounted gear wheels 84 and 85 respectively, and these gear wheels mesh with gear wheels 86 and 87 mounted upon shafts 88 and 89. The shafts 86 and 87 are journaled in hangers 90 carried by the ledge 9 and in registers 91 supported by the rear edge of the ledge 11 adjacent to the vertical door 10, these registers being easily observed by opening said door.

The shafts 76 and 89 are of a greater length than the shafts 77 and 88, and upon the outer ends of these shafts are mounted beveled gear wheels 92 and 93 adapted to mesh with beveled gear wheels 94 and 95 loosely mounted upon longitudinal shafts 96 and 97, journaled in bearings 98 carried by the base plate 1. Mounted upon the shafts 96 and 97 adjacent to the beveled gear wheels 94 and 95 are hubs 99 having arms 100 adapted to be engaged by pins 101 carried by the beveled gear wheels, these elements being similar to the elements 48, 49$^a$, 50 and 51 previously described in connection with the total recorder of the coin receiving and delivering mechanism.

The shafts 96 and 97 extend into recorders 102 and 103 respectively, and these recorders constitute the means employed for maintaining the total registration of all paper bills placed in the openings 53, while the single registers 91 maintain a register of the number of bills placed in and removed from one of the openings 53.

*The sales recorders.*—These recorders are located upon the inner side of the vertical wall 8, at the ends of the cash register and beneath the inclined end walls 30, and are adapted to be operated to register the fact that the sale has been made.

The sales recorders are identical in construction, and the details in connection with each recorder are shown in Figures 14 to 18 inclusive. A recorder comprises a shaft 104 revolubly mounted in the vertical wall 8. The outer end of the shaft 104 is provided with a knob 105 and the inner end of said shaft is provided with a circular type head 106. Intermediate the ends of the shaft 104 is a circular dial 107 provided with circumferentially arranged rows of numerals 108, the numerals of one row being staggered with relation to the numerals of the other row. These numerals are adapted to represent amounts of sales, and when a sale amounting to thirty cents is to be recorded, the shaft 104 is rotated until the numeral 30 registers with an indicator 109 located upon the outer side of the vertical wall 8.

The circular type head 106 is provided with circumferentially arranged recesses 110, these recesses corresponding in number and arrangement to the numerals 108 upon the dial 107. Each recess is provided with a type block 111 having a shank 112 provided with a type 113. Arranged within each recess is a coil spring 114 and the tension of this spring normally retains the type block in a retracted position, whereby the type head 106 can be easily shifted to properly position a type block for printing purposes.

The shaft 104 is provided with a longitudinal bore 115 for a push rod 116. This rod protrudes from the knob 105 and is provided with a button 117, encircling the protruding end of the rod 116 between the knob 105 and the button 117 is a coil spring 118 adapted to normally hold the push rod 116 in the position shown in Fig. 11 with the button 117 in advance of the knob 105, whereby the button 117 can be pushed by the palm of the hand to move the rod 116 inwardly after the knob 105 has been turned to correctly position one of the numerals 108. The inner end of the rod 116 protrudes from the type head 106 and is provided with an actuating head 119 having two inclined converging surfaces 120, the object of which will presently appear.

Pivotally connected to the rear end of the rod 116, as at 121, are two arms 122, which are pivotally mounted, as at 123, upon the T-shaped head 124 of a bracket 125, carried by the vertical wall 8. The outer ends of the arms 122 are bent, as at 126, to engage type blocks 111 presented at the ends of said arms, and when the rod 116 is pushed inwardly the arms are adapted to move diametrically opposed type blocks, for a purpose that will hereinafter appear.

The vertical wall 8 is provided with vertically alining brackets 127 located to aline with the outer edges of the type head 106, and journaled in said brackets are shafts 128 and 129. Detachably mounted upon the shafts 128 and 129 and adapted to rotate with said shafts are spools 130 and 131 adapted to support rolls of paper 132 and 133 respectively, one roll being adapted to feed to the other and maintain a strip of paper in front of the type head 106. The strip of paper in passing from one roll to the other passes by a bearing block 134, carried by the vertical wall 8, and this bearing block braces the strip of paper while the same is impinged by the type 113 of a type block 111.

In order that the rolls of paper 132 and 133 can be simultaneously moved to feed paper from one roll to the other, the shafts 128 and 129 are provided with ratchet wheels 135 and 136 respectively, the teeth of the wheel 135 being the reverse of the teeth of the wheel 136. Adapted to engage the ratchet wheels 135 and 136 are pivoted spring pressed pawls 137, carried by vertically alining levers 138 movably connected to a vertical extension 139 of the bracket 125. The levers 138 are provided with longitudinal slots 140 and extending through said slots and engaging in the vertical extension 139 are pins 141, these pins retaining the levers 138 in engagement with the extension 139 but allowing said levers to move vertically. The confronting ends of the levers 138 are beveled, as at 142 to engage the inclined converging surfaces 120 of the actuating head 119. To normally retain the ends of said levers in engagement with the head 119, coil springs 143 are used, these springs being attached to the vertical extension 139 and to said levers.

To place ink upon the type 113, the vertical wall 8 diametrically opposite the bearing block 134 is provided with a pad holder 144 for a pad 145, said pad being made of absorbent material capable of retaining ink, which is admitted to the pad through an opening 146 provided therefor in the holder.

When the rod 116 is pushed inwardly, the arms 122 are adapted to move diametrically opposed type blocks, one of said blocks causing the type thereof to print upon a strip of paper against the bearing block 134, while the type of the other block contacts with the inking pad 145. When the button 117 of the rod 116 is released, the spring 118 restores the rod to its normal position and causes the actuating head 119 to move the levers 138. These levers, through the medium of the pawls 137 and the ratchet wheels 135 and 136, move the shafts 128 and 129 and shift the strip of paper against the bearing block 134, whereby an unprinted space upon the strip of paper will be sufficient for the next actuation of the rod 116.

It will be observed that the sale recorders are entirely independent of the remainder of the registering mechanism of the register and that easy access can be had to the sale recorders through the medium of the doors 12, when it is desired to renew the paper rolls and examine the rolls to check over the various sales. While the sales recorders are independent of the other registering mechanism of the cash register, nevertheless, they constitute an important adjunct necessary in maintaining a complete record of operations performed in connection with the cash register.

It is thought that the operation and utility of the various mechanisms of the cash register will be understood without further description, and I reserve the right to use any one or all of the herein described mechanisms for maintaining a record of moneys handled in a business transaction.

Having now described my invention what I claim as new, is:—

1. In a cash register, the combination with a casing, and registering mechanisms located in said casing, of slides for depositing and delivering money from said casing, said slides being adapted to actuate said registering mechanism, revoluble paper holding drums located in said casing, circumferentially arranged resilient overlapping blades carried by said drums and providing pockets for paper money, and means for moving said drums.

2. A machine of the type described comprising a casing, coin holders, means for depositing and delivering coins in and from said holders, means for registering the amount of coins deposited and the amount of coins delivered in and from said holders, revoluble drums located in said casing, overlapping resilient blades arranged in operative relation with respect to each other and with respect to the drums to constitute pockets for paper money, retaining means carried at the ends of the drums for said blades and means for revolving said drums.

3. A cash register, comprising revoluble paper holding drums, resilient blades carried by said drums for holding paper, means for holding said blades to retain paper placed between said blades, and means for moving said drums.

4. A cash register, comprising revoluble paper holding drums, resilient blades carried by said drums for holding paper, means for holding said blades to retain paper placed between said blades, means for moving said drums, and means for registering a movement of said drums in either direction.

5. A cash register, comprising a casing, revoluble paper holding drums located in said casing, shutters carried by said casing and adapted to move said drums, and means within said casing for registering a movement of said drums.

6. A paper holder for cash registers, comprising a revoluble drum, resilient paper holding blades carried thereby, retaining members in connection with said drum for causing said blades to overlap and hold paper placed between said blades.

7. A paper holder for cash registers, comprising a revoluble drum, resilient paper holding blades carried thereby, retaining members in connection with said drums for causing said blades to overlap and hold paper placed between said blades, and means for moving said drums.

8. A paper holder for cash registers, comprising a revoluble drum, resilient paper holding blades carried thereby, retaining members in connection with said drums for causing said blades to overlap and hold paper placed between said blades, and means for moving said drums, said means including a horizontally movable shutter, and gear wheels actuated by said shutter.

9. A paper holder for cash registers, comprising a revoluble drum, resilient paper holding blades carried thereby, retaining members in connection with said drums for causing said blades to overlap and hold paper placed between said blades, means for moving said drums, and means for registering a movement of said drum in either direction.

10. A machine of the type described comprising a casing, coin holders, means for depositing and delivering coins in and from said holders, means for registering the amount of coins deposited and the amount of coins delivered in and from said holders, revoluble drums located in said casing, overlapping resilient blades arranged in operative relation with respect to each other and with respect to the drums to constitute pockets for paper money, retaining means at the ends of the drums for said blades, means for revolving said drums, and a registering mechanism for registering the operation of the drum.

In testimony whereof I affix my signature in the presence of two witnesses.

GEORGE H. WOLFF.

Witnesses:
K. H. BUTLER,
A. J. TRIGG.